United States Patent [19]
Chaneac

[11] Patent Number: 5,163,638
[45] Date of Patent: Nov. 17, 1992

[54] ENGINE AND LIFT UNIT FOR AIRCRAFT AND NEW TYPE OF AIRCRAFT FITTED WITH SUCH A UNIT

[76] Inventor: André Chaneac, 2 place de la Paix 07200 Aubenas, France

[21] Appl. No.: 727,486

[22] Filed: Jul. 9, 1991

[30] Foreign Application Priority Data

Jul. 19, 1990 [FR] France .................. 90 09473

[51] Int. Cl.⁵ .................. B64C 27/82; B64C 29/00
[52] U.S. Cl. .................. 244/17.19; 244/23 B; 244/23 D
[58] Field of Search .......... 244/17.19, 17.21, 23 B, 244/23 D, 52

[56] References Cited

U.S. PATENT DOCUMENTS

| | | | |
|---|---|---|---|
| 2,433,251 | 12/1947 | Whiting | 244/17.19 |
| 2,969,937 | 1/1961 | Trojahn | 244/17.19 |
| 3,048,353 | 8/1962 | Holmes | 244/17.19 |
| 3,171,614 | 3/1965 | Holmes | 244/23 R |
| 3,260,482 | 7/1966 | Stroukoff | 244/17.19 |
| 3,510,087 | 5/1970 | Strickland | 244/17.19 |
| 3,752,417 | 8/1973 | Lagace | 244/23 B |
| 3,799,473 | 5/1974 | Bortel | 244/17.19 |

FOREIGN PATENT DOCUMENTS 253227 3/1984 France .
2088302 6/1982 United Kingdom .

Primary Examiner—Galen Barefoot
Assistant Examiner—Virna Lissi Ansley
Attorney, Agent, or Firm—Wall and Roehrig

[57] ABSTRACT

An engine and lift unit for rotary wing aircraft together with means for balancing of the rotational torque of the said wings is shown. The rotational torque is balanced by a blower propeller, disposed horizontally below the rotor, inside an enclosure including a vertical duct surrounding the blower propeller and whose lower open end exits under the fuselage of the aircraft. A horizontal duct opens into an intermediate zone of the vertical duct and exits out the rear of the aircraft. An adjustable shutter assembly is disposed in the junction of the two ducts allowing the creation of two adjustable air flows, one directed vertically downwards and the other directed towards the rear of the aircraft. The aircraft also has fixed wings, flaps, rudders and controls so the pilot can operate the aircraft in flight.

5 Claims, 2 Drawing Sheets

ENGINE AND LIFT UNIT FOR AIRCRAFT AND NEW TYPE OF AIRCRAFT FITTED WITH SUCH A UNIT

The present invention relates to a new type of engine and lift unit for aircraft and more particularly for aircraft with rotating wings; it also relates to a new type of aircraft fitted with such a unit.

BACKGROUND OF THE INVENTION

It is well known that in the various types of aircraft, such as helicopters, autogyros, etc..., one of the problems which arise is that of the balancing of the torque created by the rotating wings in order to maintain a stable direction. One of the most widely used solutions, particularly in the case of a helicopter, consists in having recourse to a vertical propeller placed at the end of the tail, this propeller preventing the rotation of the aircraft. Such an effective solution does, however, have the disadvantage of increasing the weight and size and of making piloting difficult.

The present invention allows these disadvantages to be overcome.

In general, the invention therefore relates to a new type of engine and lift unit for aircraft comprising rotating wings associated with means allowing the balancing of the rotational torque of the said wings and it is characterised in that the means for balancing the rotational torque are constituted by a blower propeller, disposed horizontally below the wings, inside an enclosure comprising:

- a vertical duct surrounding the blower propeller and whose lower open end emerges under the fuselage of the aircraft;
- a horizontal duct opening into an intermediate zone of the vertical duct and whose outflow is directed towards the rear of the aircraft and;
- an adjustable shutter assembly, disposed in the zone of junction of the two abovementioned ducts and which allows the creation of two air flows whose flow rates are adjustable with respect to each other, one directed vertically downwards and the other directed towards the rear of the aircraft.

Because of such a design, not only is the rotational torque of the rotating wings balanced for the rotational torque of the horizontal blower propeller placed at the inlet of the vertical duct but also, as this propeller rotates in the opposite direction to that of the rotor, it allows a compression of the air which, because of the structure of the complete unit, contributes to the takeoff and to the actual flight.

In general and in other words, it can be said that the blower propeller associated with the rotating rotor is disposed inside a hollow enclosure substantially having the shape of a T, which is rotated through 90° in order that the horizontal section of the T is vertical and the vertical section is horizontal, thus allowing the obtaining of an assembly having three branches; one with horizontal prolongation and two with vertical prolongation.

SUMMARY OF THE INVENTION

According to one embodiment of the invention:

the engine and lift unit comprises two vertical engine shafts, which are concentric but rotate in opposite directions, placed at the centre of the vertical duct and in the upper section of the duct, one driving the rotor of the aircraft and the other driving the blower propeller; the engine driving the shafts is disposed below the propeller and inside the vertical duct;

the adjustable shutter assembly is constituted by a controlled rotary or slide valve, allowing the pilot to vary the outflow of the air compressed by the blower propeller either vertically to the lower section of the aircraft or horizontally to the rear section of the aircraft, or both at once.

Furthermore, such an engine and lift unit allows the obtaining of a new type of aircraft which is characterised in that the engine and lift unit is placed inside a volume, denoted in the rest of the description by the term "fuselage", whose longitudinal cross-section is a thick-wing profile, whose vertical aerodynamic axis is substantially located on the axis of the concentric vertical engine shafts, the vertical inlet of the unit (upper opening of the vertical duct) being placed on the upper surface of the wing and the rear outlet being placed on a vertical wall joining the upper surface to the lower surface of the wing.

DETAILED DESCRIPTION OF THE DRAWINGS

The invention and the advantages which it provides will however be better understood by means of the following example of an embodiment, given by way of nonlimitative example, which is illustrated by the appended diagrams in which.

DETAILED DESCRIPTION OF A PREFERRED EMBODIMENT

Figure 1:
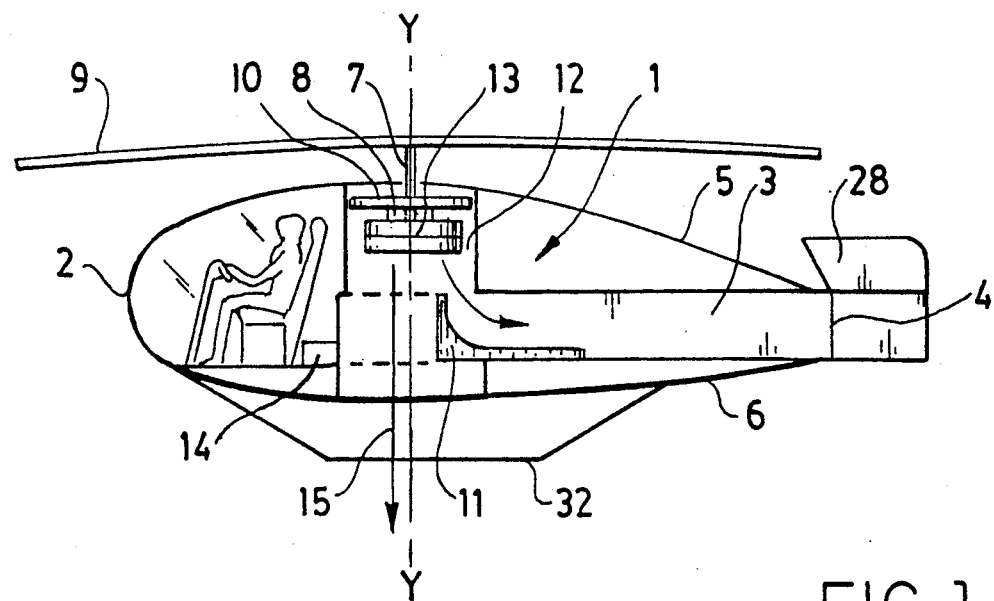
FIG. 1 is a diagrammatic view in longitudinal cross-section of an aircraft fitted with an engine and lift unit according to the invention.
Figure 2:
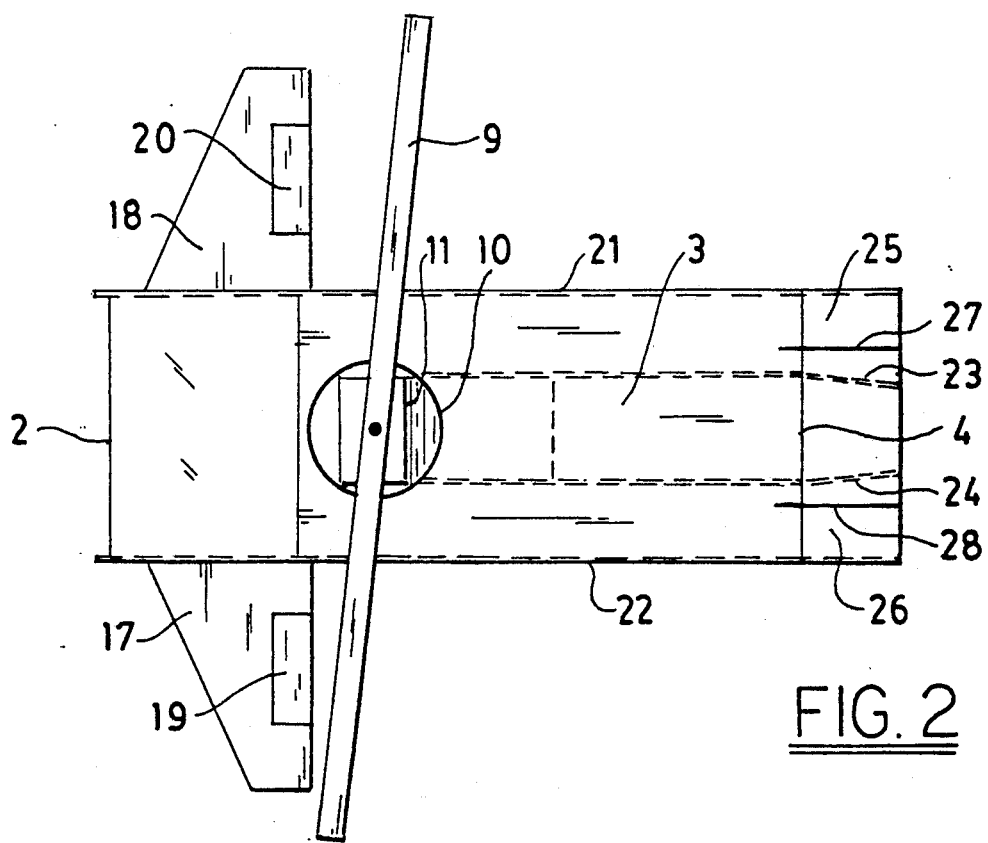
FIG. 2 is a diagrammatic plan view of such an aircraft.

Referring to FIGS. 1 and 2 which, as mentioned above, respectively show, in longitudinal cross-section and in plan view, an aircraft fitted with an engine and lift unit according to the invention, this assembly being denoted by the general reference (1) and essentially constituted by a hollow enclosure in the form of a T-shaped duct having undergone a rotation of 90°, in order that the horizontal section of the T is vertical and forms two ducts (12) and (15) and that the vertical section is horizontal and forms a duct (3). This assembly (1) is disposed inside a "fuselage", denoted by the general reference (2), having, in the embodiment shown, a thick-wing profile comprising an upper surface (5) and a lower surface (6), connected to each other by a rear vertical section (4). In the upper section of the vertical duct (12) there is disposed, immediately below the rotor 9, a blower propeller (10). The rotor (9) and the blower propeller (10) are driven by means of one or two engines (13) by the intermediary of two concentric and vertical engine shafts (7, 8) placed in the centre of the vertical duct (12) substantially along the aerodynamic axis of the assembly. The engine shaft (7) drives the rotor (9) of the aircraft, the second engine shaft (8), for its part, driving the blower propeller (10) which is disposed at the top of the vertical duct (12) immediately below the rotor (9). The two engine shafts (7) and (8) rotate in opposite directions, which allows the balancing of the rotational torque of the rotor 9. The open face of the lower duct (15) emerges under the fuselage of the aircraft. The horizontal duct (3) has one end which opens into the vertical duct and an open outlet directed towards the rear of the aircraft but which emerges at the rear vertical section (4) joining the upper surface (5) to the lower surface (6). An adjustable shutter assembly, denoted by the general reference (11), comparable to a "slide" valve is disposed in the junction zone between the horizontal duct (3) and the vertical duct (12, 15). In the embodiment shown, this shutter assembly is, as previously mentioned, in the form of a slide valve and can be displaced inside the horizontal duct (3) in such a way as to be able to create two air flows having flow rates which are adjustable with respect to each other, one of the flows being directed vertically downwards, the other directed towards the rear of the aircraft, these flows being represented by the two arrows in FIG. 1. Such a slide valve therefore allows the total or partial blocking of the outlet (15) of the vertical duct (12) and the opening or closing of the inlet of the horizontal duct (3) which opens into the vertical duct (12), thus allowing the pilot to vary the outflow of the air compressed by the blower propeller (10) either vertically to the lower section of the aircraft, or horizontally to the rear section of the aircraft, or both at once. A girder (14) allows the fixing of the side wings (17) and (18) and of the undercarriage (37) which supports the aircraft when it is in contact with the ground.

Figure 4:
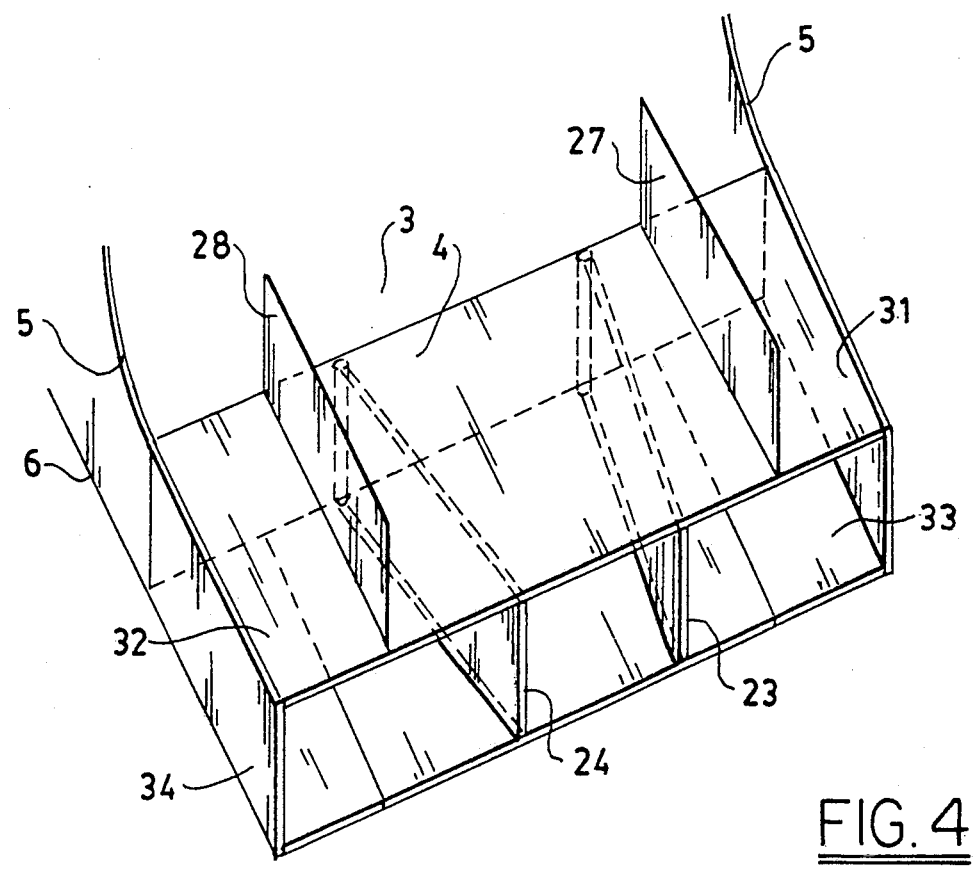
FIG. 4 is a diagrammatic view, in perspective, showing in greater detail an embodiment of the rear section of an aircraft fitted with an engine and lift unit according to the invention.

Referring more particularly to FIGS. 2 and 4, in the embodiment shown, the rear vertical wall (4) comprises vertical steering flaps (23) and (24) allowing the horizontal steering of the air compressed by the blower propeller (10) as well as horizontal flaps (25) and (26) allowing the aircraft to be made to descend or ascend and also two steering rudders (27) and (28).

Figure 3:
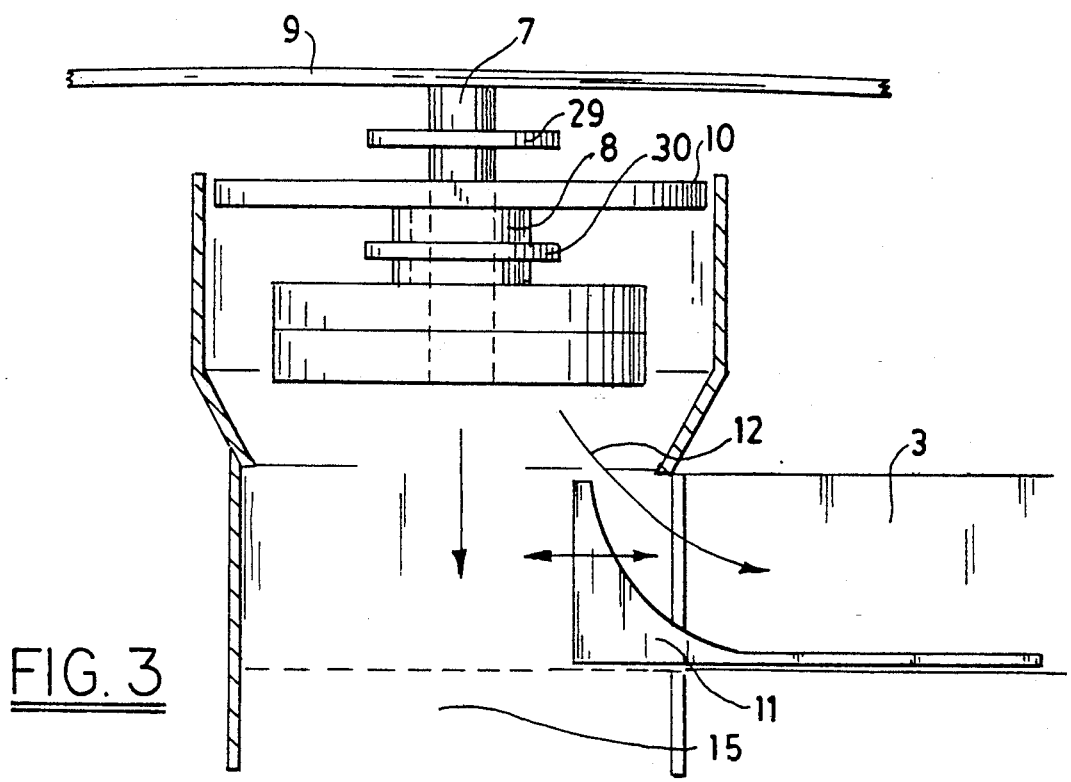
FIG. 3 is a partial diagrammatic view in longitudinal cross-section, showing the embodiment of the engine and lift unit according to the invention in greater detail and an embodiment of the adjustable shutter assembly which such a unit comprises.

FIG. 3 shows in greater detail the structure and functioning of such an engine and lift unit. As can be seen from this figure, one of the two engine shafts (7) and (8) drives the rotor (9) and the other drives the blower propeller (10). The slide valve (11), controlled by the pilot, allows the air compressed by the blower propeller (10) to be passed from the branch (12) either through the open face (15) which emerges under the aircraft, or through the rear horizontal branch (3) which emerges at the rear, or through both at once. Torque sensors (29) and (30) can replace the pilot by means of a pneumatic and electronic system equalising the two torques created by the rotor (9) and the blower propeller (10) in order to stabilise the direction of the aircraft.

FIG. 4 is a diagrammatic and perspective representation of the arrangement of the rear section of such an aircraft. Referring to this figure, the rear vertical wall (4) joins the upper surface (5) to the lower surface (6) of the fuselage having a thick-wing profile. This rear section comprises fixed stabilising steering rudders (27) and (28), upper horizontal flaps (31) and (32) and lower horizontal flaps (33) and (34) disposed within the profile of the upper surface (5) and of the lower surface (6).

The vertical flaps (23) and (24) allow the steering of the output (3) of the flow of air compressed by the blower propeller (10) and therefore the steering of the aircraft The functioning of such an assembly is as follows: The pilot operates the slide valve (11) so that the air compressed by the blower propeller (10) emerges through the vertical duct (15) and does not pass through the horizontal duct. He starts the engines (13) and continuously balances the torques of the rotor (9) and of the blower propeller (10) by varying either the pitches or the rotational speeds of the rotor (9) and of the blower propeller (10), since these two components rotate in opposite directions. The aircraft can take off as soon as the thrust of the rotor (9) and of the air ejected from inside the vertical duct is greater than the load. Starting from a reasonable height, the pilot begins to open the slide valve (1), which allows the outflow through the duct (3) of a portion of the compressed air and therefore causes the forward motion of the aircraft. The pilot continues to open the slide valve (11) until the duct (15) is fully closed, the aircraft substantially reaching the speed of output of the air compressed by the blower propeller (10). As soon as the aircraft has achieved a sufficient speed, the load is balanced by the thrust due to the lift of the fuselage having a thick-wing shape (2) and of the wings (17) and (18). The pilot can stop the engine shaft (7) of the rotor (9) or can cancel its pitch in order to assist the forward speed. The pilot steers by means of the ailerons (19) and (20) of the wings (17) and (18) and (31, 32, 33, 34) of the rear (4). The rotational torque of the blower propeller (10) is balanced by the horizontal steering of the air stream from the duct (3) by means of the vertical flaps (23) and (24).

To end the operation, the pilot starts the engine shaft (7) or sets the pitch of the rotor (9), then closes the side valve (11) in order to eliminate the forward thrust, and then reduces the engine speed in order to land gently.

The invention is, of course, not limited to the example of embodiment described above but it covers all of its variants produced according to the same concept.

Thus, whereas in the described example the means allowing the adjustment and division of the air flows generated by the blower propeller are constituted by a slide valve, the use of any equivalent means such as, for example, a rotary valve or a system of movable flaps could be considered. Similarly, the engine and lift unit according to the invention could be implemented on any type of aircraft other than that described having a shape other than that of a thick-wing shape. Furthermore, in the case of an aircraft having a thick-wing shape, as can be seen in FIG. 1, protrusion beyond the profile of the said wing can be considered in order to constitute the fixed undercarriage (37) in contact with the ground. Furthermore, the design of the engine and lift unit according to the invention can allow the passing through the inside of two concentric engine shafts of a vision tube which can form a periscope allowing rear vision.

I claim:

1. An engine and lift unit for aircraft having a rotor associated with means allowing the balancing of the rotational torque of the said rotor means comprising:
   a blower propeller disposed horizontally below the rotor;
   a vertical duct surrounding the blower propeller and whose lower open end emerges under the fuselage of the aircraft;

a horizontal duct opening into an intermediate zone of the vertical duct and whose outflow is directed towards the rear of the aircraft and;

an adjustable shutter assembly, disposed in the zone of junction of the two above-mentioned ducts, said shutter assembly comprising a slide valve placed at the junction of the vertical and horizontal ducts, and which allows the creation of two air flows whose flow rates are adjustable with respect to each other, one directed vertically downwards and the other directed towards the rear of the aircraft.

2. An aircraft engine and lift unit for aircraft having a rotor associated with remains allowing the balancing of the rotational torque of the said rotor means:

a blower propeller disposed horizontally below the rotor;

a vertical duct surrounding the blower propeller and whose lower open end emerges under the fuselage of the aircraft;

a horizontal duct opening into an intermediate zone of the vertical duct and whose outflow is directed towards the rear of the aircraft;

an adjustable shutter assembly, disposed in the zone of junction of the two above-mentioned ducts, and which allows the creation of two air flows whose flow rates are adjustable with respect to each other, one directed vertically downwards and the other directed towards the rear of the aircraft;

two concentric engine shafts, rotating in opposite directions, placed at the center of the vertical duct and in the upper section, one driving the rotor of the aircraft and the other driving the blower propeller; and a fuselage in the form of a volume whose longitudinal cross-section is a thick-wing profile and whose vertical aerodynamic axis is substantially located on the axis of the concentric vertical engine shafts and a vertical inlet of the unit being formed in the upper surface of the wing and the rear outlet of the duct being formed in a vertical rear wall joining the upper surface to the lower surface of said wing.

3. An aircraft according to claim 2 further including:

a pair of horizontal flaps mounted one on each side of the rear end of said fuselage lateral surfaces;

a pair of vertical steering flaps pivotally mounted in the outflow of said horizontal duct;

means for controlling said horizontal and vertical flaps so that the pilot may control operation of the aircraft.

4. An aircraft according to claim 3 including torque sensors operatively connected to said flap controlling means to automatically control said aircraft.

5. Aircraft according to claim 2, wherein the tow lateral sides of the "fuselage" are substantially vertical and are provided with wings each having an aileron.

* * * * *

UNITED STATES PATENT AND TRADEMARK OFFICE
CERTIFICATE OF CORRECTION

PATENT NO. : 5,163,638
DATED : November 17, 1992
INVENTOR(S) : ANDRE CHANEAC

It is certified that error appears in the above—identified patent and that said Letters Patent is hereby corrected as shown below:

Col. 5, line 13, "remains" should be --means--.

Col. 6, line 25, "tow" should be --two--.

Signed and Sealed this

Sixteenth Day of November, 1993

Attest:

BRUCE LEHMAN

Attesting Officer

Commissioner of Patents and Trademarks